(12) United States Patent
Groll et al.

(10) Patent No.: US 9,078,539 B2
(45) Date of Patent: Jul. 14, 2015

(54) COOKWARE WITH SELECTIVELY BONDED LAYERS

(71) Applicant: All-Clad Metalcrafters LLC, Canonsburg, PA (US)

(72) Inventors: William A. Groll, McMurray, PA (US); John Watkins, Canonsburg, PA (US)

(73) Assignee: All-Clad Metalcrafters LLC, Canonsburg, PA (US)

( * ) Notice: Subject to any disclaimer, the term of this patent is extended or adjusted under 35 U.S.C. 154(b) by 0 days.

(21) Appl. No.: 14/215,287

(22) Filed: Mar. 17, 2014

(65) Prior Publication Data

US 2015/0001226 A1  Jan. 1, 2015

Related U.S. Application Data

(60) Provisional application No. 61/787,041, filed on Mar. 15, 2013.

(51) Int. Cl.
| | | |
|---|---|---|
| *A47J 36/02* | (2006.01) | |
| *A47J 37/10* | (2006.01) | |
| *A47J 27/022* | (2006.01) | |
| *B23K 20/02* | (2006.01) | |
| *B23K 31/02* | (2006.01) | |
| *B23K 20/00* | (2006.01) | |

(52) U.S. Cl.
CPC ............. *A47J 36/02* (2013.01); *A47J 27/022* (2013.01); *A47J 37/10* (2013.01); *B23K 20/023* (2013.01); *B23K 31/02* (2013.01); *B23K 20/002* (2013.01); *B23K 2201/12* (2013.01)

(58) Field of Classification Search
CPC ......... A47J 36/025; A47J 36/02; A47J 37/10; A47J 27/002; B21D 51/22; B65D 25/14
USPC ............ 220/573.2, 573.1, 912, 62.17; 29/447
See application file for complete search history.

(56) References Cited

U.S. PATENT DOCUMENTS

| | | |
|---|---|---|
| 2,284,504 A | 5/1942 | Wrighton et al. |
| 2,908,073 A | 10/1959 | Dulin |
| 4,029,253 A | 6/1977 | Cartossi |
| 4,204,628 A | 5/1980 | Houston et al. |
| 4,252,263 A | 2/1981 | Houston |
| 4,315,591 A | 2/1982 | Houston |
| 4,385,310 A | 5/1983 | Houston |
| 4,444,352 A | 4/1984 | Glascock, II et al. |
| 5,064,055 A | 11/1991 | Bessenbach et al. |

(Continued)

FOREIGN PATENT DOCUMENTS

| | | |
|---|---|---|
| CN | 2892466 | 4/2007 |
| EP | 0966910 A1 | 12/1999 |

(Continued)

*Primary Examiner* — Robert J Hick
(74) *Attorney, Agent, or Firm* — The Webb Law Firm (57) ABSTRACT

Cookware comprising a selectively bonded composite of at least two layers of materials wherein the first of the at least two layers of materials has a plurality of spaced-apart bubbles formed on its surface, defining a cooking surface of the cookware, and a second layer of two layers of material is bonded thereto, wherein the bonding between the bubbles and the second material is of a lesser degree than the bonding between the first and second layers of materials in areas intermediate the bubbles, whereby a coefficient of heat conductivity is greater in the intermediate areas than in the bubbles.

9 Claims, 7 Drawing Sheets

(56) References Cited

U.S. PATENT DOCUMENTS

| | | |
|---|---|---|
| 5,193,737 A | 3/1993 | Carraher |
| 5,439,165 A | 8/1995 | Cartossi |
| 5,848,746 A | 12/1998 | Wagner et al. |
| 6,082,611 A | 7/2000 | Kim |
| 6,892,781 B2 | 5/2005 | McHerron et al. |
| 7,159,757 B2 | 1/2007 | Takahashi et al. |
| 7,168,148 B2 | 1/2007 | Groll |
| 7,581,669 B2 | 9/2009 | Lee |
| 7,900,811 B1 | 3/2011 | Alman et al. |
| 8,037,602 B2 * | 10/2011 | Huang ........................ 29/890.03 |
| 2004/0232211 A1 | 11/2004 | Kayser et al. |
| 2006/0117539 A1 | 6/2006 | Alim |
| 2008/0083747 A1 * | 4/2008 | Park .............................. 219/621 |
| 2009/0258248 A1 | 10/2009 | Tsushima |
| 2010/0055491 A1 | 3/2010 | Vecchio et al. |

FOREIGN PATENT DOCUMENTS

| | | |
|---|---|---|
| JP | 2002059505 | 2/2002 |
| JP | 2002065469 | 3/2002 |
| JP | 2006341272 | 12/2006 |
| JP | 4261129 | 4/2009 |

* cited by examiner

COOKWARE WITH SELECTIVELY BONDED LAYERS

CROSS REFERENCE TO RELATED APPLICATIONS

This application claims priority to U.S. Provisional Patent Application Ser. No. 61/787,041 entitled "Cookware With Selectively Bonded Layers", filed Mar. 15, 2013, which is hereby incorporated by reference in its entirety.

BACKGROUND OF THE INVENTION

1. Technical Field of the Invention

The present invention relates generally to cookware as well as the methods for making same and, more particularly, to cookware having a multi-layer, selectively bonded composite construction which provides improved cooking performance and easier cleaning. Another aspect of the invention relates to methods for bonding layers of materials together for making composite blanks of near net shape so as to minimize scrap losses.

2. Description of Related Art

It has long been known to manufacture multi-layer bonded composite cookware in which various materials are joined together to combine the desired physical properties of each of the materials into a composite. For example, the corrosion resistance of stainless steel is ideal for the cooking surface as well as for the exterior surface of cookware; however, the thermal conductivity of stainless steel is not relatively high. On the other hand, aluminum and/or copper offer much higher thermal conductivities and have been bonded to stainless steel to provide well-known composite cookware items such as pots, pans, and the like. Such well-known composite cookware constructions and methods for making are disclosed in U.S. Pat. Nos. 4,004,892; 6,267,830; and 7,820,304, to mention only a few.

The bonded aluminum and/or copper layers, while offering higher thermal conductivity for faster heating, may also result in hot spots on the cooking surface which can cause sticking of the food being cooked and more difficult clean-up of the stainless steel cooking surface. Non-stick surfaces such as PTFE material are also applied to the cook surface to counter the sticking problem; however, the surface underlying the PTFE cooking may also be subject to hot spots which may cause the PTFE to thermally degrade prematurely due to localized hot spots and, thus, limit its useful life. I have heretofore developed a composite construction having at least one bonded core layer of a lower thermal conductivity stainless steel or titanium which acts as a "heat dam" in the composite to cause the heat applied to the cookware to conduct radially and, thus, prevent hot spots from occurring along the cook surface. Thus, the useful life of PTFE (or the like) non-stick surface is increased. See, for example, U.S. Pat. Nos. 6,926,971; 7,278,231; and 7,906,221, all to William A. Groll. It is also known that conventional PTFE non-stick surfaces are prone to scratching if metal tools are used and, therefore, a higher standard of care must be used with such non-stick coatings in order to extend their useful life. Even with careful usage, the PTFE coatings have a finite life as the organic material in the coating tends to naturally degrade and lose its lubricity over time.

SUMMARY OF THE INVENTION

The multi-layer composite cookware of the present invention comprises at least two layers of materials which are selectively bonded together. The finished cook surface of the cookware in one embodiment has a plurality of substantially evenly spaced-apart, raised dimpled portions or bubbles with flat surfaces between adjacent raised bubbles. A first layer of the at least two layers carrying the raised bubbles is solid state bonded to the underlying second layer by the application of pressure along with elevated temperature. As a result of the pressure or force applied in a normal direction relative to the planes of the bonded layers and the elevated temperature, the bonding between the first and second layers in the areas of the raised bubbles is not as great as the bonding between the flat surfaces between the adjacent raised bubbles. As a result of this bonding differential, a greater amount of thermal energy from the heat of the cooking range or the like is transmitted by conduction through the flat surfaces compared with the thermal energy conducted through the raised bubbles. In this manner, the pan is heated uniformly and the raised bubbles which contact the food have lower localized heat which eliminates or minimizes sticking problems.

In one presently preferred embodiment of the invention, the composite cookware is in the form of a fry pan, for example, comprising three layers of selectively bonded materials. In this embodiment, the three layers consist of a cook surface of stainless steel material which carries the dimples or bubbles, selectively bonded to an inner core layer of aluminum material which, in turn, is uniformly bonded to a bottom layer of stainless steel material which forms the exterior of the fry pan. The dimples or bubbles on the cook surface are formed by a perforated template which is placed on the outer side of the stainless steel layer prior to the selective bonding operation. In this example of a three-layer fry pan, a stack of three plies of material, in this case stainless steel, aluminum and stainless steel, are placed on top of one another, with the perforated template placed adjacent and outside the stainless steel layer intended to form the cooking surface. The aluminum and stainless steel layers are then positioned therebeneath. A force is applied to the stacked array at an amount of between, for example, 15,000 psi and 35,000 psi. The force is applied in a direction normal to the planes of the stacked layers of materials while the stack is heated to a temperature of between 500 and 1000° F. during the application of the force. Under the influence of the applied normal pressure and elevated temperature, solid state bonding between the layers of materials occurs. The elevated temperature also causes the interior aluminum layer to thermally expand against the stainless steel layers, and particularly against the first stainless steel layer which has the perforated template positioned on its outer surface. The thermally expanding aluminum layer presses against the stainless steel of the first layer, causing the stainless steel to deform outwardly into the perforations or holes in the template to form the dimples or bubbles across the spaced-apart perforations in the template. The flat spaces between the perforations in the template contact the upper surface of stainless steel so as to achieve a very strong bond between the first stainless steel layer and the underlying aluminum layer, while the bond between the stainless steel and aluminum is minimal or absent in the areas of the bubbles. The bond between the aluminum and the second layer of stainless steel therebeneath is uniformly good because of the flat surfaces therebetween. Because the bond in the areas of the bubbles is selectively absent or minimized, the thermal conductivity in those areas is, likewise, decreased, thus decreasing hot spots on the food contacting bubble/dimple areas.

Another aspect of the present invention pertains to methods for forming a plurality of composite blanks of various materials without bubbles using the diffusion bonding process described herein.

DETAILED DESCRIPTION OF THE INVENTION

Figure 1:
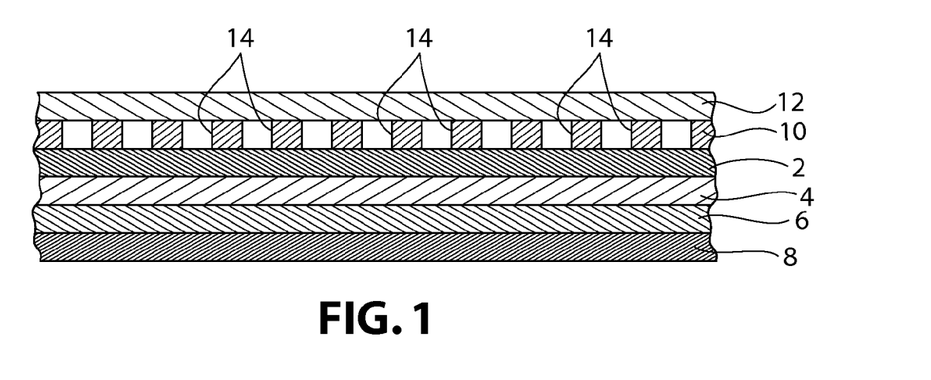
FIG. 1 is a cross-sectional schematic drawing of an ordered array of the various layers of materials used in making one presently preferred embodiment of the present invention.
Figure 2:
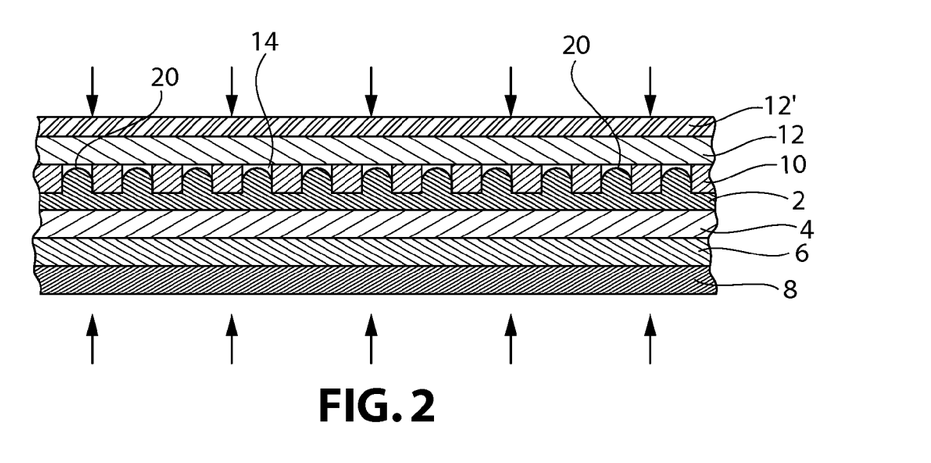
FIG. 2 is a cross-sectional schematic similar to FIG. 1 showing the ordered array of materials during the bonding step under the influence of a pressure applied in the normal direction with heating.
Figure 3:
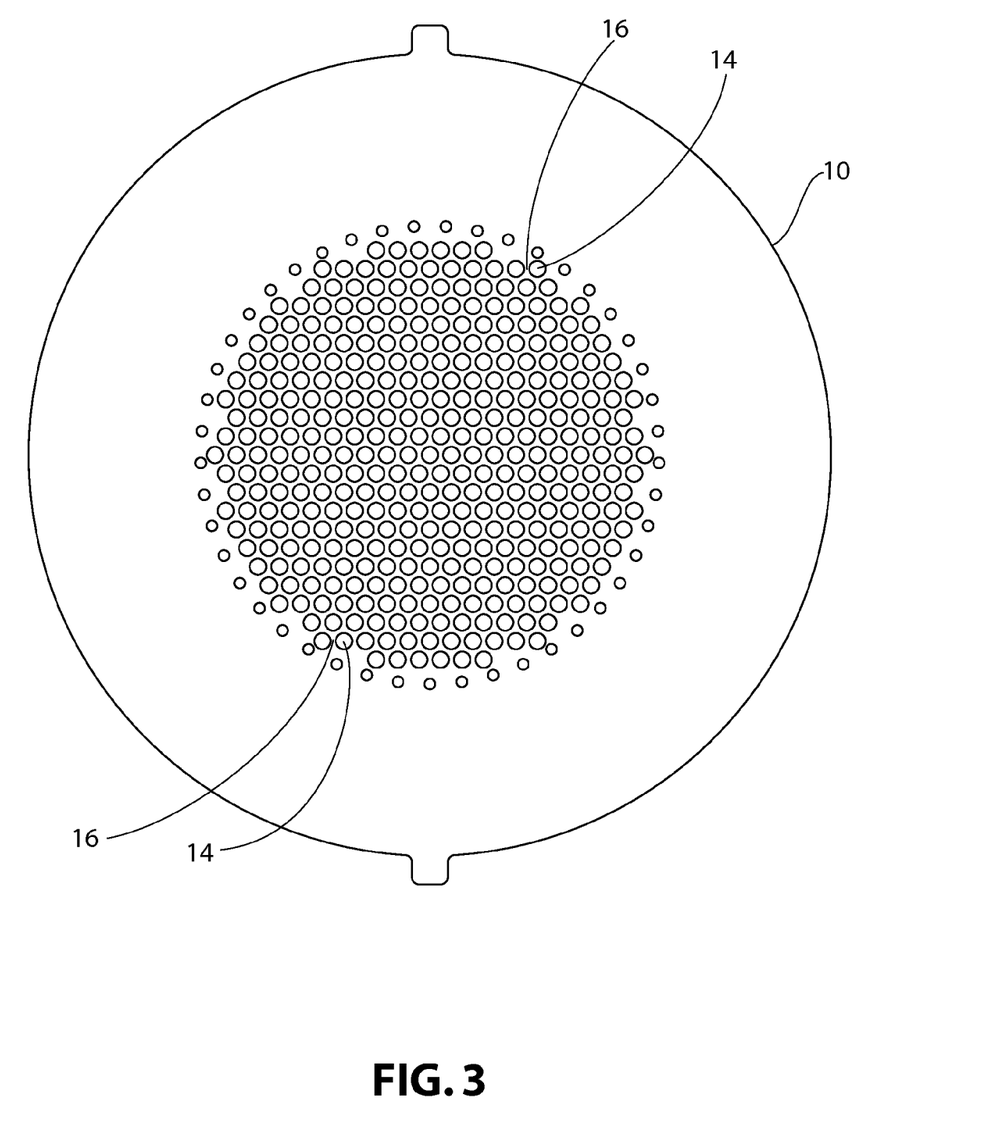
FIG. 3 is a plan view of a perforated template used in one preferred embodiment of the invention.
Figure 4:
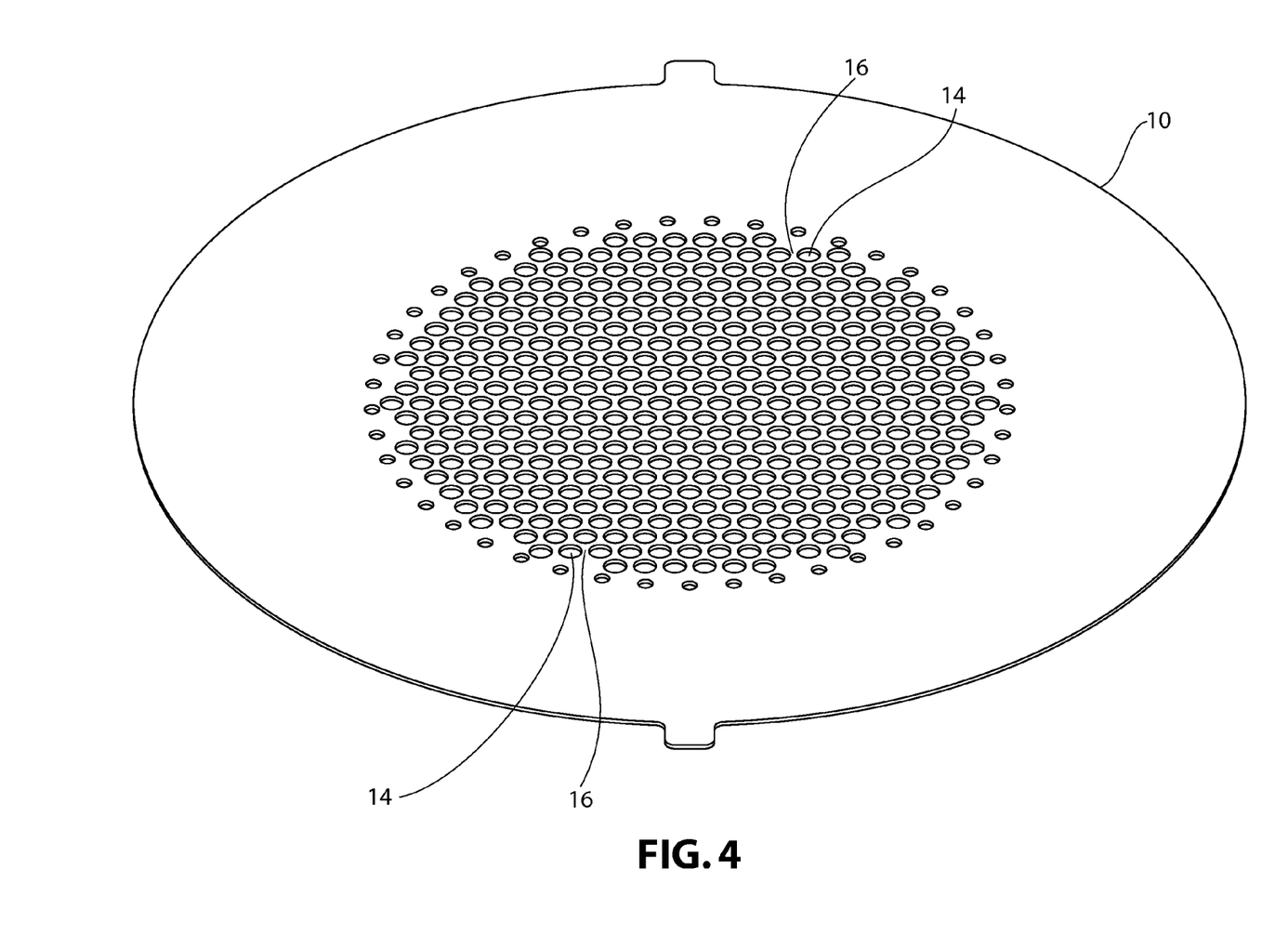
FIG. 4 is a perspective view of the perforated template of FIG. 3.
Figure 7:
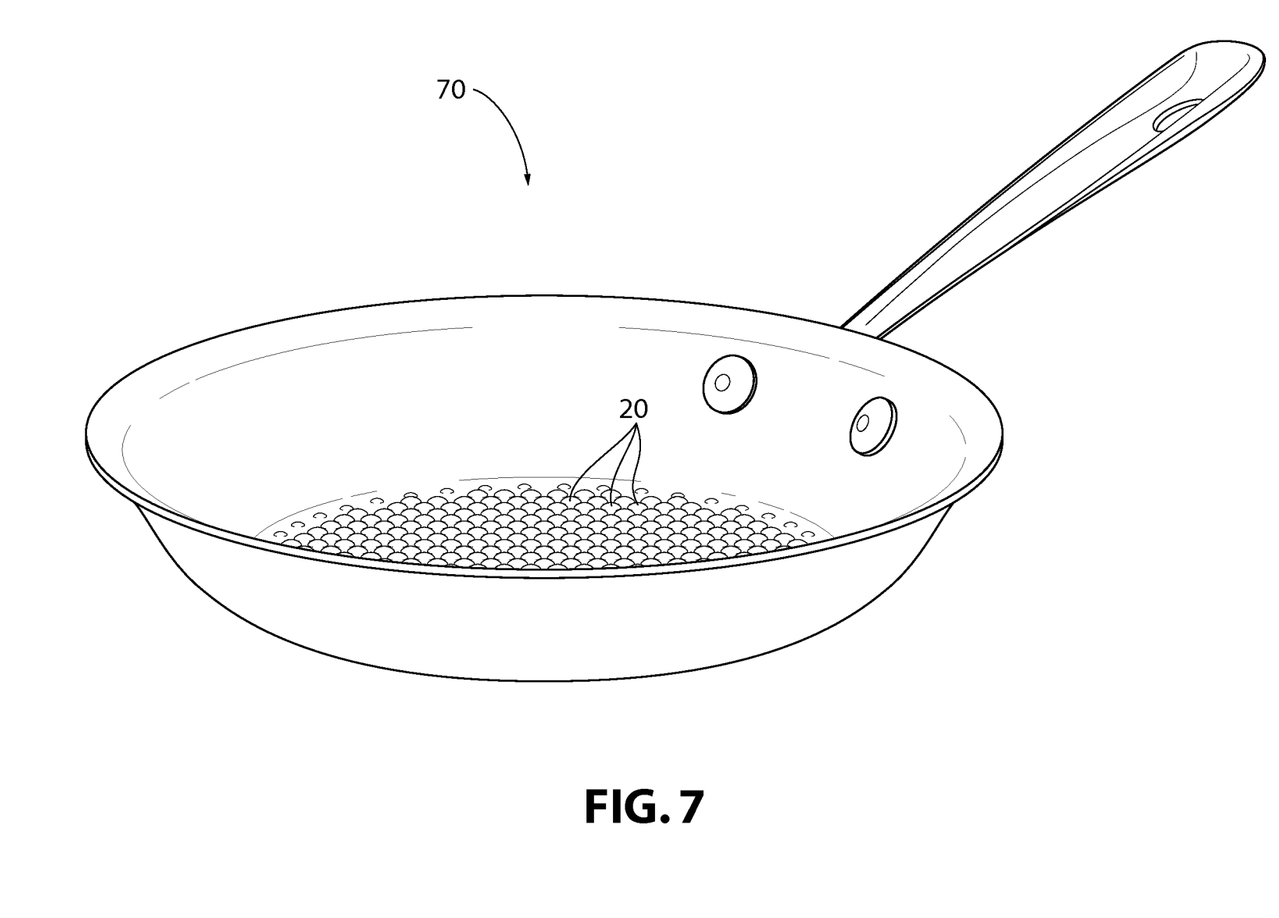
FIG. 7 is a perspective view of the finished cookware of one embodiment of the present invention showing the raised dimples/bubbles on the cooking surface thereof.

With reference to FIGS. 1 and 2 of the drawings, in one of its simplest forms, the invention comprises an ordered array of materials comprising a first layer 2 of stainless steel material, which is positioned on an upper surface of a core layer 4 of aluminum material which, in turn, is positioned on an upper surface of a second layer 6 of stainless steel material. The layers 2, 4, and 6 are preferably round shaped flat discs of a diameter suitable for making a bonded composite blank for subsequent forming into the shape of a fry pan (FIG. 7). A perforated template 10, as shown also in FIGS. 3 and 4, is positioned on top of the first stainless steel layer 2 in the ordered stacked array of materials shown in FIGS. 1 and 2. The perforated template 10 contains a plurality of spaced-apart throughholes 14 interspaced between closed flat portions 16 in the central area of the template 10. The outer border area of the template 10 has no perforations. In a presently preferred embodiment, approximately 50% of the surface area of the perforated template 10 contains open through holes 14. This ratio of open through holes 14 to closed portions 16, by surface area, may vary between about 25-75% in the central area of the template 10. Presently, about a 50% hole ratio appears to be very acceptable. The holes can be round or may be other shapes, such as, for example, rectangles, squares, hexagons and the like. In one present embodiment, shown in the drawings, the round hole diameter of each through hole 14 in the perforated template 10 is 0.287 inch in diameter and the spacing between holes is 0.375 inch from each, hole center. The perforations 14 in the central portion are intended to form the bubbles 20 along the cooking surface of the cookware while the outer border (without perforations) is intended to form the area of the smooth sidewall of the cookware.

FIG. 2 schematically (not to scale) demonstrates the bonding operation of the ordered array of one presently preferred embodiment which bonds the first stainless steel layer 2 to the core layer 4 of aluminum and the second, lower layer 6 of stainless steel, wherein an axially applied force is imposed upon the stacked array, including the perforated template 10, by way of an upper platen 12, 12' and a lower platen 8 under a pressure of between about 15,000-35,000 psi, wherein the force is applied in a normal 90 direction to the plane of the stacked array 10, 2, 4, 6. During the application of the pressure which ideally is around 20,000 psi, a heat is also applied between about 800-900 F or, more broadly, 750-950 F, for a period of time sufficient to achieve bonding between the stainless steel layer 2, aluminum layer 4, and stainless steel layer 6. During the application of the temperature and pressure, the aluminum layer 4 thermally expands, forcing the first stainless steel layer 2 to expand into the through holes 14 of the perforated template 10 to form a plurality of dimples or bubbles 20 in the first stainless steel layer 2. The template 10 is also formed preferably of stainless steel, which will not form a bond with the first stainless steel layer 2 during the application of pressure and temperature. Thus, upon completion of the pressure and temperature bonding operation, when the force is removed, as shown in FIG. 2, the template 10 will not bond to the first layer of stainless steel 2 and can be reused in subsequent bonding operations.

Figure 5:
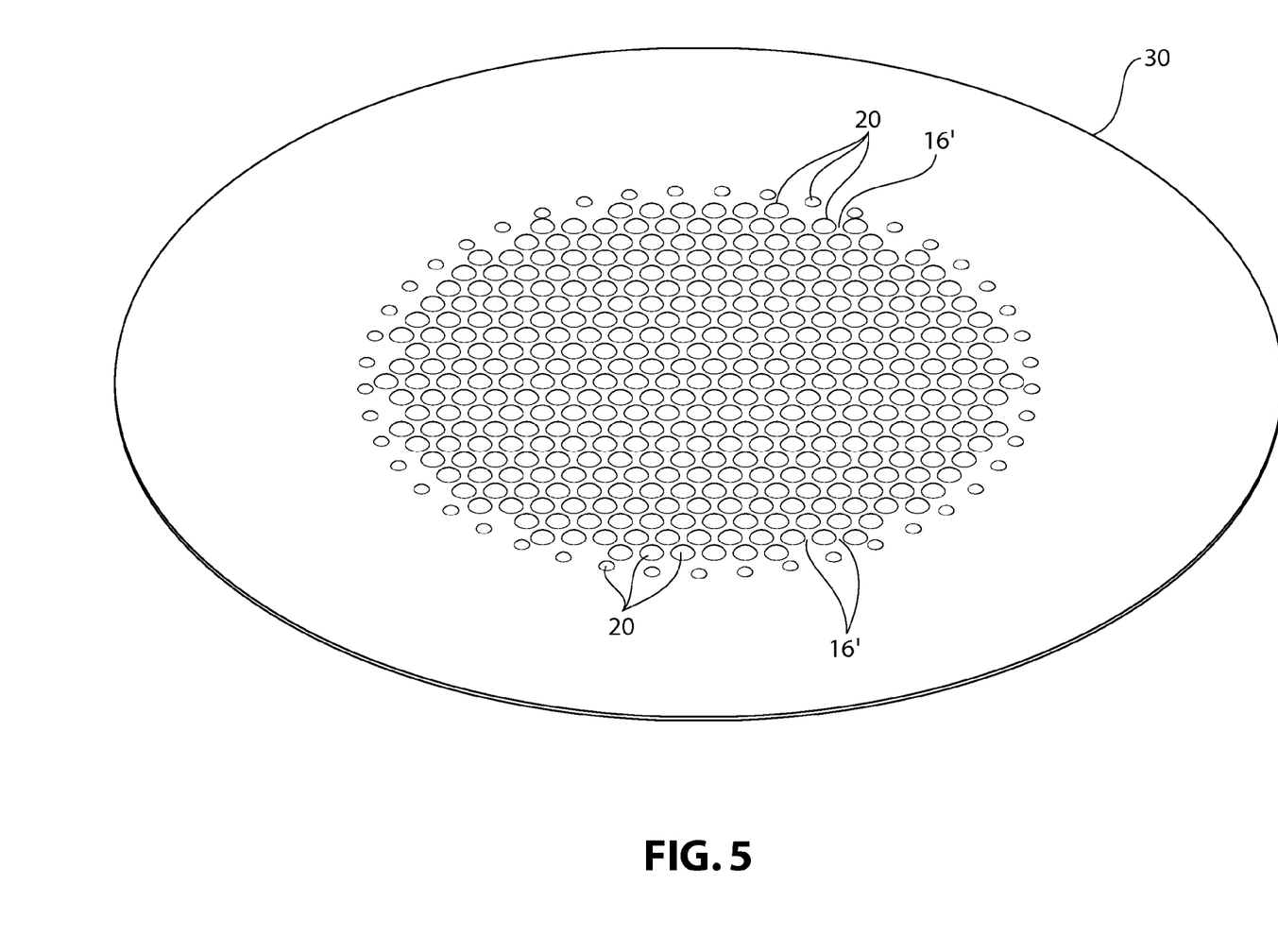
FIG. 5 is a perspective view of the selectively bonded composite blank of the invention showing the dimples or bubbles on the cooking surface.

FIG. 5 shows the flat round blank 30 after the bonding operation with the perforated template 10 removed from the bonded blank comprising the first stainless steel layer 2 bonded to the aluminum core layer 4 and the lower, second stainless steel layer 6 bonded to the core layer 4. The raised dimples or bubbles 20 are shown on the bonded blank 30 shown in FIG. 2 and FIG. 5.

The round three-layer composite bonded blank 30 shown in FIG. 2 and FIG. 5 is then inserted in a forming machine such as a hydroform drawing or like machine which forms the flat bonded blank 30 by drawing the round blank 30 into a finished fry pan 70, for example, having the round cookware shape as shown in FIG. 7. Other composite bonded blank shapes, e.g., oval, square, rectangular, may be used depending on the finished shape of the cookware desired.

Of course, it is well-known in bonding sheets of materials or blanks of materials to clean each layer of the material surfaces prior to bonding. This may be done in various known ways, such as in a protective atmosphere or by a cleaning technique whereas the oils are burned off, or by abrading the surface by grit blasting, or by wire abrasion, or by chemical activation and so on. In any event, the discs for bonding the composite blanks usually are in the form of a round shape (or other desired shape) of sufficient diameter to provide for a blank size which will permit, after bonding, the forming of a shape of the cookware of sufficient diameter to provide the cookware of the desired diameter with minimal or no scrap loss. In this manner, the present invention provides for a much more economical process for making near net sized bonded composite blanks wherein there is very little loss for scrap, particularly when considering the value of a composite material. Conventionally, when wider strips of material are roll-bonded together, such as stainless steel, aluminum, copper and stainless steel, into a roll-bonded strip and then blanked, the outlying materials forming a carrier web surrounding the blank are lost as scrap. This web material has much less value from a scrap standpoint because the web layers have been previously bonded together by rolling. To the contrary, in the present invention, only the round (or other shape) blank of material is formed as a composite bonded blank. As a result, there is no residual scrap composite material along the carrier web as in the prior conventional roll-bonding processing technique using continuous strip materials.

Figure 6:
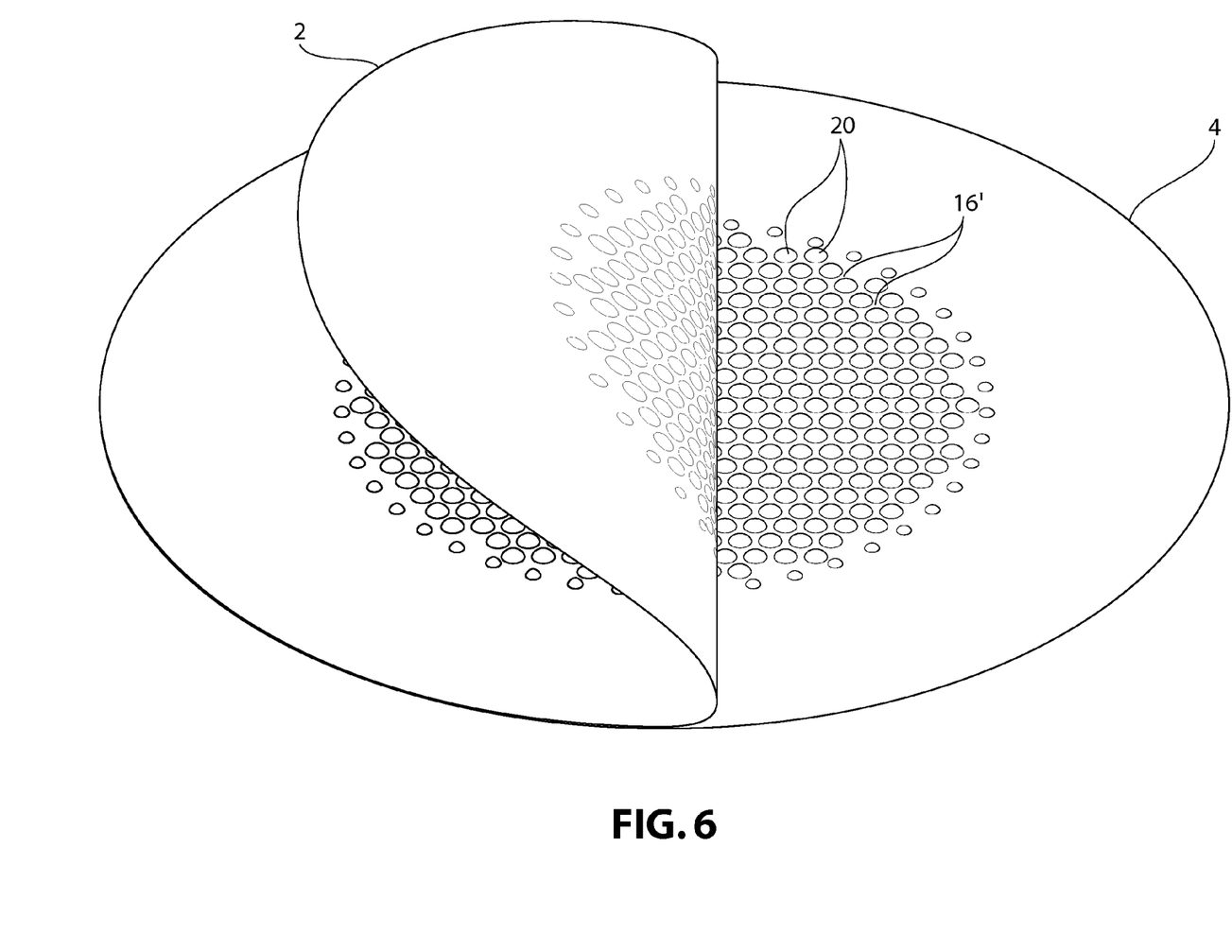
FIG. 6 is a perspective view of a peeled array blank of FIG. 5.

FIG. 6 depicts the bonded layer 2 of stainless steel peeled from the underlying layer 4 of aluminum showing the undersides of several of the bubbles 20. In actual tests, the undersides of the bubbles or dimples 20 are of lighter color on the right-hand side, indicating no or lesser bonding between the first layer 2 of stainless steel and the aluminum layer 4 in the areas of the bubbles 20 compared to the flat areas 16 therebetween.

It is also important to note that in the present invention with the dimpled or bubble formation 20 being formed in the stacked array, that the dimpled or bubble configuration cannot be formed by conventional roll bonding. The aluminum material, being much more ductile than the stainless steel material, would not withstand the rolling forces so as to produce any dimpled effect in roll bonding. The aluminum would simply deform in a linear fashion and would not produce the required dimpled or bubble pattern finish in the stainless steel.

It will be also understood that while the invention has been described as bonding only three materials together to form one composite blank 30, the process could be easily adapted to bond more than a single composite blank. Thus, a perforated plate (if used) could be positioned between the stacked arrays of blanks 30 to produce additional blanks of composite material which can be subsequently drawn into finished pans. This is likewise true of stacks of materials without the use of the perforated plate to merely bond stacks of composite blanks of a variety of materials together which can be then drawn directly into finished cookware without the waste of scrap material previously generated in conventional roll bonding. In this alternate embodiment, a solid disk of, for example, stainless steel (without perforations) could be positioned between the adjacent stacked arrays of blanks to prevent bonding between the adjacent stacked arrays of blanks during application of pressure and heat. Various flat discs, such as stainless steel, aluminum, copper and titanium, could be used in bonding the near net shape composite blanks in stacked arrays.

Figure 8:
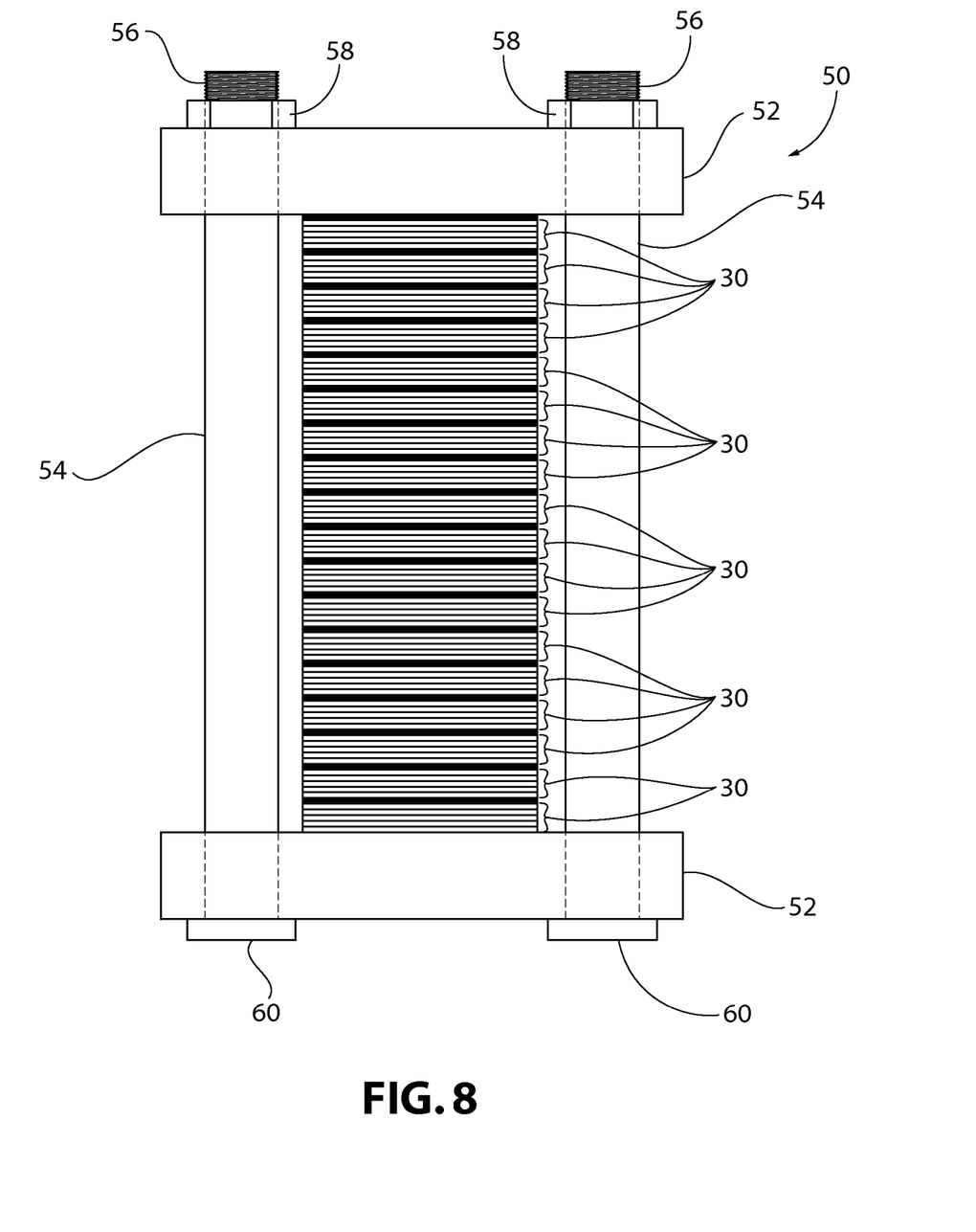
FIG. 8 is a simplified side elevational view of a pressing fixture for use in a method of the present invention.

In practice, I have found that the use of a pressure fixture or jig 50 of FIG. 8 is useful in applying an axial clamping pressure to the one or more stacked arrays of discs for bonding the composite blanks. The fixture comprises two opposed heavy round platens or plates 52 for engaging the respective upper and lower discs in the stacked may(s) of blanks 30. A plurality of heavy duty bolts 54 are fitted in holes spaced around the periphery of the platens. The bolts have headed portions 60 at one end and opposed threaded ends 56 to receive nuts 58 which, when tightened, force the platens 52 together so as to apply a force in a direction normal to the discs of the stacked array(s) of blanks 30 situated between the opposed platens 52. In one present embodiment, ten bolts 54 are used to apply the bonding pressure. Double nuts 58 may be used at each bolt end 56 to ensure proper strength. After the desired clamping pressure is obtained, the fixture and stacked array(s) of blanks may be moved to a furnace and heated in a normal atmosphere containing oxygen, to a desired temperature to achieve the bonding between the individual discs in the stack array(s). Alternatively, the stacked array of the blanks may be heated by an induction heating unit which is positioned adjacent to and around the stacked array of blanks so as to avoid heating the fixture 50 to high temperatures as would otherwise occur in a furnace. In the event more than one multi-layered stacked arrays of discs are to be bonded, a stainless steel disc is inserted between adjacent stacked arrays to prevent bonding between adjacent stacked arrays.

In one actual bonding test run three hundred blank assemblies 30 were constructed using three layers of round discs (14" in diameter) of stainless steel, aluminum, and stainless steel layers for each blank assembly. The three hundred blank assemblies 30 were stacked in the pressure fixture 50 between the platters 52. In this example, the fixture 50 measured about six feet in height and the steel platens 52 measured about one foot thick. The heavy platens minimize flexing in the platens to provide an even distribution of pressure across the stacks of blank assemblies so as to achieve uniform bonding of the stainless steel-aluminum-stainless steel layers of each blank. In this example, the fixture 50 had ten high-strength bolts 54 positioned evenly around the periphery of the round platens 52. After the bolts 54 were tightened and a desired pressure of about 20,000 psi was achieved, the fixture 50 was placed in a furnace and heated to a temperature of about 860° F. to achieve excellent bonding throughout each of the three hundred stacked arrays of blanks 30. The economics of this method of making bonded composite blanks of a desire net shape (diameter) is apparent. In the elevated temperature bonding step, it is not necessary to control the atmosphere in that a normal oxygen containing atmosphere is acceptable. Also, it is preferred to surround the stack of preformed blanks with an induction heating means to heat only the blanks and not the fixture. In this manner, the fixture is not affected by the heat supplied by the induction heating means.

While specific embodiments of the invention have been described in detail, it will be appreciated by those skilled in the art that various modifications and alternatives to those details could be developed in light of the overall teachings of the disclosure. The presently preferred embodiments described herein are meant to be illustrative only and not limiting as to the scope of the invention which is to be given the full breadth of the appended claims and any and all equivalents thereof.

The invention claimed is:

1. Cookware comprising a selectively bonded composite of at least two layers of materials wherein a first of the at least two layers of materials has a plurality of spaced-apart bubbles formed on its surface, defining a cooking surface of the cookware, and a second layer of the at least two layers of material is bonded thereto, wherein the bonding between the bubbles and the second material is of a lesser degree than the bonding between said first and second layers of materials in areas intermediate said bubbles, whereby a coefficient of heat conductivity is greater in said intermediate areas than in said bubbles.

2. The cookware of claim 1, wherein the cookware is a three-layered selectively bonded composite comprising a cooking surface of stainless steel of the first layer, a second core layer of aluminum, and a third layer of stainless steel bonded to the aluminum core layer.

3. The cookware of claim 1 made by a process comprising the steps of:
    (a) providing a first planar layer of material;
    (b) providing a second planar layer of material;
    (c) providing a third planar layer of material;
    (d) providing a perforated template having a plurality of holes formed therein positioned on an upper surface of the first planar material;
    (e) applying pressure in a normal direction of the first, second, and third planar materials;
    (f) applying heat to the materials while under pressure to provide bonding therebetween; and
    (g) forming the plurality of spaced-apart bubbles along a surface of the first planar material.

4. The cookware of claim 3 wherein the first planar layer of material is stainless steel, the second planar layer of material is aluminum, and the third planar layer of material is stainless steel.

5. The cookware of claim 4 wherein the first, second, and third planar layer of materials are in a round shape in plane view.

6. The cookware of claim 5, wherein the perforated template has a perforated area occupied by about 50% by area of open holes therethrough.

7. The cookware of claim 3 wherein the applying of pressure step (e) is in the range of 15,000 psi to 35,000 psi.

8. The cookware of claim 3 wherein the applying of heat step (e) is in the range of 750 F to 950 F.

9. Cookware having a three-layer bonded construction with a central layer of aluminum sandwiched between inner and outer layers of stainless steel, wherein a cook surface on the inner layer of stainless steel has a plurality of spaced-apart, raised dimples surrounded by flat lower portions, and wherein the raised dimples have a lower coefficient of thermal conductivity than that of the flat portions.

* * * * *

UNITED STATES PATENT AND TRADEMARK OFFICE
CERTIFICATE OF CORRECTION

PATENT NO. : 9,078,539 B2  
APPLICATION NO. : 14/215287  
DATED : July 14, 2015  
INVENTOR(S) : William A. Groll et al.

Page 1 of 1

It is certified that error appears in the above-identified patent and that said Letters Patent is hereby corrected as shown below:

In the Claims

Column 7, Line 2, Claim 5, delete "plane" and insert -- plan --

Signed and Sealed this  
Twenty-first Day of June, 2016

Michelle K. Lee  
*Director of the United States Patent and Trademark Office*